(12) United States Patent
Guthrie et al.

(10) Patent No.: US 9,438,380 B2
(45) Date of Patent: *Sep. 6, 2016

(54) SYSTEMS, METHODS, AND APPARATUS FOR FACILITATING CLAIMS PROCESSING

(71) Applicant: The Travelers Indemnity Company, Hartford, CT (US)

(72) Inventors: David M. Guthrie, Longmeadow, MA (US); Salvatore A. DeSimone, Southwick, MA (US); Steven Furtado, Middletown, CT (US); Edward A. Hennen, Minneapolis, MN (US); Jonathan A. Pope, Sturbridge, MA (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,182

(22) Filed: Jun. 19, 2015

(65) Prior Publication Data

US 2015/0288486 A1  Oct. 8, 2015

Related U.S. Application Data

(63) Continuation of application No. 13/763,564, filed on Feb. 8, 2013, now Pat. No. 9,083,673.

(60) Provisional application No. 61/597,537, filed on Feb. 10, 2012.

(51) Int. Cl.
| | |
|---|---|
| *G06F 11/00* | (2006.01) |
| *H04L 1/08* | (2006.01) |
| *H04L 29/08* | (2006.01) |
| *G06F 11/07* | (2006.01) |
| *G06F 11/14* | (2006.01) |

(52) U.S. Cl.
CPC .............. *H04L 1/08* (2013.01); *G06F 11/0709* (2013.01); *G06F 11/0748* (2013.01); *G06F 11/0772* (2013.01); *G06F 11/1443* (2013.01); *H04L 67/02* (2013.01); *H04L 67/06* (2013.01)

(58) Field of Classification Search
CPC ..................... G06F 11/3368; G06F 11/2097
See application file for complete search history.

(56) References Cited

U.S. PATENT DOCUMENTS

| | | | |
|---|---|---|---|
| 6,583,799 B1 | 6/2003 | Manolis et al. | |
| 7,146,575 B2 | 12/2006 | Manolis et al. | |
| 7,818,518 B2 | 10/2010 | Gladwin et al. | |
| 8,311,981 B2 | 11/2012 | Braginsky et al. | |
| 8,665,337 B2 | 3/2014 | Mikawa et al. | |
| 2009/0182671 A1 | 7/2009 | Kloppers | |
| 2010/0205154 A1 | 8/2010 | Beliczynski | |
| 2012/0331394 A1 | 12/2012 | Trombley-Shapiro et al. | |
| 2013/0212432 A1 | 8/2013 | Guthrie et al. | |
| 2013/0297680 A1 | 11/2013 | Smith et al. | |
| 2014/0071482 A1 | 3/2014 | Ishibashi | |
| 2014/0289367 A1 | 9/2014 | Kinebuchi et al. | |

OTHER PUBLICATIONS

Office Action for U.S. Appl. No. 13/763,564 dated Nov. 6, 2014; 11 pps.

Notice of Allowance for U.S. Appl. No. 13/763,564 dated Mar. 11, 2015; 5 pps.

*Primary Examiner* — Christopher McCarthy

(74) *Attorney, Agent, or Firm* — Michael D. Downs; Fincham Downs LLC

(57) ABSTRACT

Systems, apparatus, methods, and articles of manufacture provide for facilitating upload of one or more electronic files from a user device to a remote server. In some embodiments, a background upload process manages connectivity of the user device to the remote server and staging file uploads in a disconnected mode for automatic processing when connectivity is restored.

19 Claims, 11 Drawing Sheets

SYSTEMS, METHODS, AND APPARATUS FOR FACILITATING CLAIMS PROCESSING

CROSS-REFERENCE TO RELATED APPLICATIONS

The present application claims the benefit of priority of U.S. patent application Ser. No. 13/763,564 filed Feb. 8, 2013, entitled "SYSTEMS, METHODS AND APPARATUS FOR FACILITATING CLAIMS PROCESSING," now U.S. Pat. No. 9,083,673; which claims the benefit of priority of U.S. Provisional Patent Application No. 61/597,537 filed Feb. 10, 2012, entitled "SYSTEMS, METHODS AND APPARATUS FOR FACILITATING CLAIMS PROCESSING." Each of the above-referenced applications is incorporated by reference in the present application.

BRIEF DESCRIPTION OF THE DRAWINGS

An understanding of embodiments described in this disclosure and many of the attendant advantages may be readily obtained by reference to the following detailed description when considered with the accompanying drawings, of which:

FIG. 6 is a diagram of an example user interface according to an embodiment of the present invention;

DETAILED DESCRIPTION

Figure 1A:
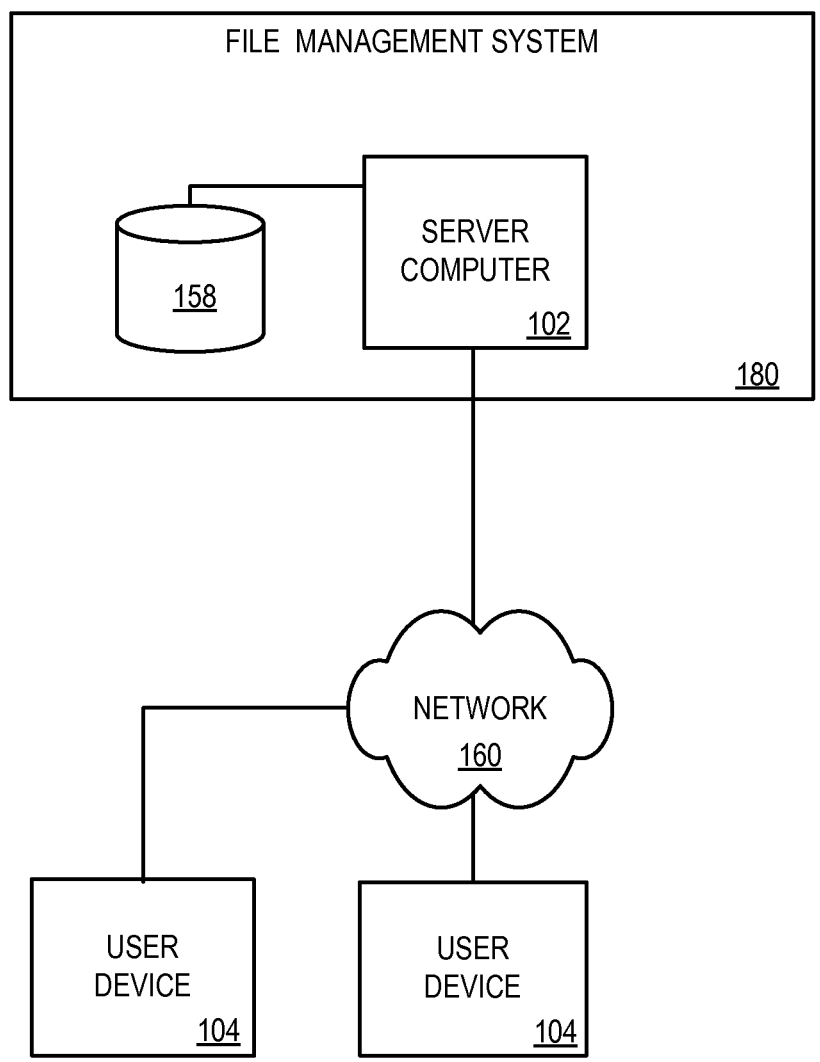
FIG. 1A is a diagram of a system according to an embodiment of the present invention.

Applicants have recognized that users who need to preserve and/or manage electronic documents, records, images, and other types of electronic files may benefit from a file upload application for uploading one or more such files from a user device to a file storage device (e.g., a remote file server) or other computing device. In accordance with some embodiments described in this disclosure, some types of users may find beneficial a file upload system whose benefits include one or more of the following:

A user may upload multiple files at the same time without having to carry out an upload process for each individual file.

A user may share associated information (e.g., file metadata) across multiple files, eliminating the need to provide the information for each file, thereby reducing data entry and keying.

A background process manages the uploading of files queued for upload with little or no user input, and automatically retries uploading files until they are successfully uploaded to the destination.

A user may stage or queue files to be uploaded when he or she is not logged on to a network (e.g., a proprietary network, a private network, the Internet), and the queued files will automatically be uploaded once the user is in communication with the network.

Allowing a user to drag and drop files directly onto an icon (or other type of interface object or interface location) reduces the need to open up a portal application and input identifying information (e.g., an insurance claim number, etc.), reducing the total steps in an upload process and saving time.

In one example process in accordance with some embodiments, a software application program executing on a user device (1) allows a user of the user device to select one or more files for upload to a remote server, (2) receives metadata information associated with the files pending for upload, (3) facilitates the uploading of the pending files, (4) facilitates the correction of errors occurring during attempted file uploads, and/or (5) automatically retries uploading pending files until the files are successfully uploaded (e.g., when a network connection is established between the user device and the remote server).

In accordance with some embodiments of the present invention, one or more systems, apparatus, methods, articles of manufacture, and/or (transitory or non-transitory) computer readable media (e.g., a non-transitory computer readable memory storing instructions for directing a processor) provide for one or more of: (i) connected and disconnected modes of operation, such that file uploads may be set up or staged with or without a network connection (e.g., without requiring a connection between a sending device and a receiving device); (ii) background processing of file uploads (e.g., without requiring input or other attention of a user after the user submits files for upload and/or without requiring foreground computer processing); (iii) maintaining a security context of a previous upload transaction for a subsequent upload transaction; (iv) sharing metadata across multiple files to be uploaded; (v) enabling user-initiated file upload set up (e.g., initiated by dragging and dropping files) without requiring separate pre-launch of an upload application; and (vi) maintaining claim information and/or security context for each of multiple files for upload. In some embodiments, at least one function or step may be performed via a user interface (e.g., presented via a display of a computing device).

It should be understood that the embodiments described herein are not limited to use with any particular type of computing device a user may use to upload files (although some preferred embodiments are described with reference to laptop computers, for example, for ease of understanding), but are equally applicable to any computing device, such as a mobile device, or a personal or client computer (e.g., in a user's home or office). Any embodiments described with reference to a particular type of user device in this disclosure should be understood to be equally applicable to any such other types of computing device, as deemed appropriate for any particular implementation(s).

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

As used herein, "computing device" may refer to, without limitation, one or more personal computers, laptop computers, set-top boxes, cable boxes, network storage devices, server computers, media servers, automatic teller machines (ATM), kiosks, personal media devices, communications devices, display devices, financial transaction systems, vehicle or dashboard computer systems, televisions, stereo systems, video gaming systems, gaming consoles, cameras, video cameras, MP3 players, mobile devices, mobile telephones, cellular telephones, GPS navigation devices, smartphones, tablet computers, portable video players, satellite media players, satellite telephones, wireless communications devices, personal digital assistants (PDA), point of sale (POS) terminals, credit card transaction systems, online or Internet purchase systems, and/or credit card or other financial account card transaction systems.

As used herein, "mobile device" and "portable device" may refer to, without limitation, a handheld computer, a tablet computer, a wearable computer, a personal digital assistant, a cellular telephone, a network appliance, a camera, a smartphone, a network base station, a media player, a navigation device, a game console, or any combination of any two or more of such computing devices.

As used herein, "background process" may refer to, without limitation, a computer process that runs in the background, that processes, executes, and/or facilitates one or more functions without user intervention, and/or a process that is not currently able to receive input (e.g., from a user of a computing device on which it is running). According to some embodiments, a background process (or results of such a process) may be used to initiate notifications to a user and/or presentation of user interfaces (e.g., user data entry screens) when appropriate, for example, in response to processing performed in the background (e.g., based on assessing the current status of files for upload). For example, a computer application may utilize a background process to perform one or more functions or processes performed in the background, and, based on the background process, may initiate, call, or facilitate one or more foreground processes of an application (e.g., for notifying a user, for requesting user input). In one example, a background process does not receive input from a user and/or may be unable to receive such input.

FIG. 1A depicts a block diagram of an example system 100 according to some embodiments. The system 100 may comprise one or more user devices 104 in communication with a controller or server computer 102 in a file management system 180 via a network 160. Typically a processor (e.g., one or more microprocessors, one or more microcontrollers, one or more digital signal processors) of user devices 104 or server computer 102 will receive instructions (e.g., from a memory or like device), execute those instructions, and perform one or more processes defined by those instructions. Instructions may be embodied, for example, in one or more computer programs and/or one or more scripts.

In one embodiment, information about a particular file stored by the file management system 180 (e.g., in database 158) may be provided advantageously to the server computer 102. For example, stored information about an insurance file (e.g., an insurance claim number), an injured claimant, a claim professional, and/or an insured (e.g., an employer of an injured worker) may be accessible by the server computer 102 without requiring manual input (e.g., by a claim professional, by a remote user uploading files).

In some embodiments a server computer 102 and/or one or more of the user devices 104 stores and/or has access to information useful for performing one or more functions of user device 104, as described in this disclosure. Such information may include one or more of: (i) computer program instructions data, (ii) files for upload, and (iii) metadata about files for upload. According to some embodiments, the server computer 102 may be in communication with one or more databases 158 for storing such information.

In some embodiments, the server computer 102 may comprise one or more electronic and/or computerized controller devices such as computer servers communicatively coupled to interface with the user devices 104 (directly and/or indirectly). The server computer 102 may, for example, comprise PowerEdge™ M910 blade servers manufactured by Dell, Inc. of Round Rock, Tex., which may include one or more Eight-Core Intel® Xeon® 7500 Series electronic processing devices. According to some embodiments, the server computer 102 may be located remote from the user devices 104. The server computer 102 may also or alternatively comprise a plurality of electronic processing devices located at one or more various sites and/or locations.

According to some embodiments, the server computer 102 may store and/or execute specially programmed instructions to operate in accordance with one or more embodiments described in this disclosure. The server computer 102 may, for example, execute one or more programs that facilitate receiving files via the network 160.

According to some embodiments, the user devices 104 may store and/or execute specially programmed instructions to operate in accordance with one or more embodiments described in this disclosure. A user device 104 may, for example, execute one or more programs that facilitate uploading files via the network 160 to the server computer 102.

In some embodiments, an application for uploading files is stored locally on the user device 104, which may access information (e.g., file metadata) stored on, or provided via, the server computer 102. In another embodiment, the server computer 102 may store some or all of the program instructions for uploading files, and the user device 104 may execute the application remotely via the network 160 and/or download from the server computer 102 (e.g., a web application server) some or all of the program code for executing one or more of the various functions described in this disclosure. Additional ways of distributing information and program instructions among one or more client computers 104 and/or server computers 102 will be readily understood by one skilled in the art upon contemplation of the present disclosure.

Figure 1B:
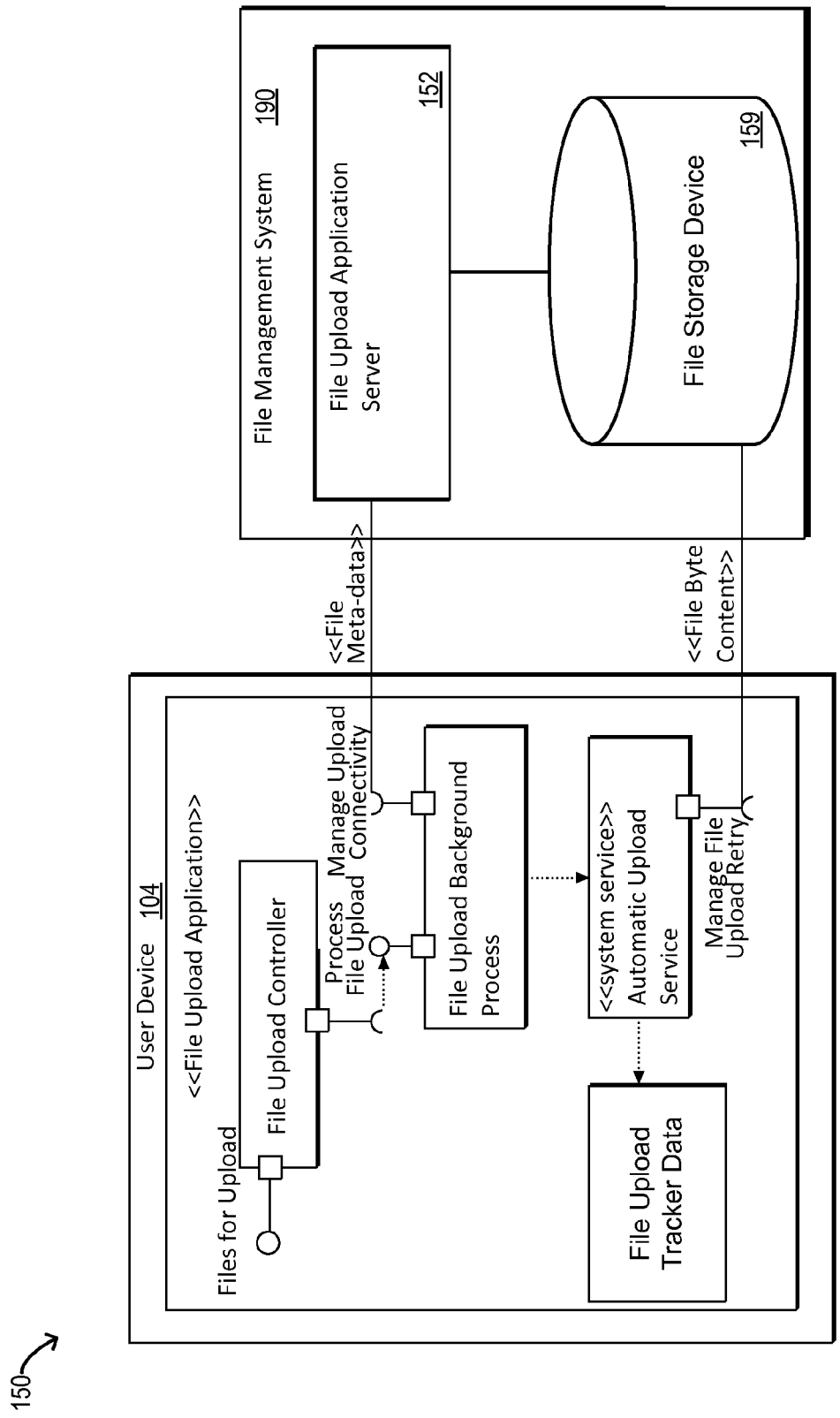
FIG. 1B is a diagram of a system according to an embodiment of the present invention.

FIG. 1B depicts a block diagram of another example system 150 according to some embodiments. The system 150 may comprise one or more user devices 104 in communication (e.g., via a network 120) with a file upload application server 152 (such as may be hosted by, for example, a server computer 102) and with a file storage device 159. File upload application server 152 and file storage device 159 are integrated into a file management system 190.

In one embodiment, the user device 104 stores files for upload, file metadata, file upload tracker data, and a file upload application comprising a file upload controller, file upload background process, and an automatic upload service. The file upload application receives an indication of files for upload (e.g., from a user). In one example, the user drags one or more files from a first location on the user device (e.g., a file folder) and drops them on an interface object for the file upload application (e.g. an icon, a program window), initiating the file upload controller to process the dropped files for upload. In another example, the user may select the files via an interface provided by the file upload application (e.g., a file explorer) to browse a folder directory on the user device. In one embodiment, the file upload controller prompts a user (e.g., via a displayed interface form) to provide metadata information associated with the one or more files for upload. The file upload background process processes files and file metadata submitted by a user to the file upload application for upload to file management system 190, and manages connectivity to the file upload application server 152 for uploading files. File upload tracker data associated with files staged for transfer (and/or staged for resubmission, in the case where upload errors occur) may be stored locally. File upload tracker data for a particular file may include one or more of a file content tracker indicating how much of the file has been transferred, a unique file identifier that identifies the file for upload, and an indication of a current upload status for the associated file. In one example, the file upload tracker data is stored in one or more files in an XML format. The metadata may be transferred from the user device 104 to the file upload application server 152 (e.g., for storage with an uploaded file in the file management system 190, for use in organizing the file in file management system 190). The file upload background process also controls an automatic upload service that transfers the content of the file for transfer to a file storage device 159 of the file management system 190. In one embodiment, the file content is transferred to a temporary location before being finally stored and made accessible via the file management system 190.

Figure 2:
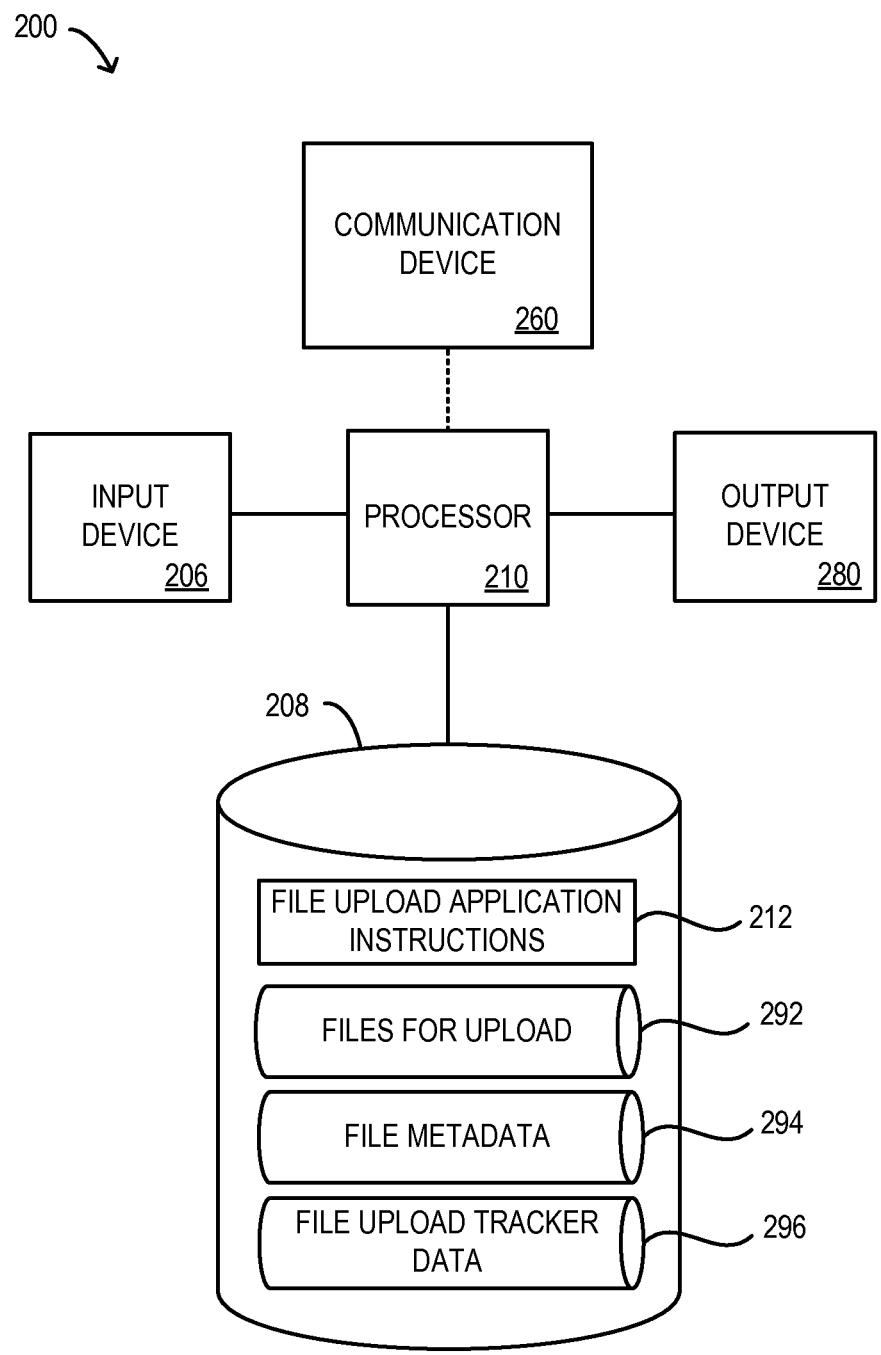
FIG. 2 is a diagram of a computing device according to an embodiment of the present invention.

Turning to FIG. 2, a block diagram of an apparatus 200 according to some embodiments is shown. In some embodiments, the apparatus 200 may be similar in configuration and/or functionality to any of the user devices 104, server computer 102, and/or file upload application server 152. The apparatus 200 may, for example, execute, process, facilitate, and/or otherwise be associated with any of the processes described in this disclosure.

In some embodiments, the apparatus 200 may comprise an input device 206, a memory device 208, a processor 210, a communication device 260, and/or an output device 280. Fewer or more components and/or various configurations of the components 206, 208, 210, 260, 280 may be included in the apparatus 200 without deviating from the scope of embodiments described in this disclosure.

According to some embodiments, the processor 210 may be or include any type, quantity, and/or configuration of processor that is or becomes known. The processor 210 may comprise, for example, an Intel® IXP 2800 network processor or an Intel® XEON™ processor coupled with an Intel® E7501 chipset. In some embodiments, the processor 210 may comprise multiple inter-connected processors, microprocessors, and/or micro-engines. According to some embodiments, the processor 210 (and/or the apparatus 200 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 900 comprises a server such as a blade server, necessary power may be supplied via a standard AC outlet, power strip, surge protector, and/or Uninterruptible Power Supply (UPS) device.

In some embodiments, the input device 206 and/or the output device 280 are communicatively coupled to the processor 210 (e.g., via wired and/or wireless connections and/or pathways) and they may generally comprise any types or configurations of input and output components and/or devices that are or become known, respectively.

The input device 206 may comprise, for example, a physical and/or virtual keyboard that allows an operator of the apparatus 200 to interface with the apparatus 200 (e.g., such as to enter data or compose an electronic message). The input device 206 may comprise, for example, one or more of a pointer device (e.g., a mouse), a camera, and/or a headphone jack. Input device 206 may include one or more of a keypad, touch screen, or other suitable tactile input device. Input device 206 may include a microphone comprising a transducer adapted to provide audible input of a signal that may be transmitted (e.g., to the processor 210 via an appropriate communications link) and/or an accelerometer or other device configured to detect movement of the device.

The output device 280 may, according to some embodiments, comprise a display screen and/or other practicable output component and/or device. The output device 280 may, for example, provide to a user information about the upload status of files submitted for upload (e.g., via a notification or upload status screen). Output device 280 may include one or more speakers comprising a transducer adapted to provide audible output based on a signal received (e.g., via processor 210).

According to some embodiments, the input device 206 and/or the output device 280 may comprise and/or be embodied in a single device, such as a touch-screen display.

In some embodiments, the communication device 260 may comprise any type or configuration of communication device that is or becomes known or practicable. The communication device 260 may, for example, comprise a network interface card (NIC), a telephonic device, a cellular network device, a router, a hub, a modem, and/or a communications port or cable. In some embodiments, the communication device 260 may be coupled to provide data to a telecommunications device. The communication device 260 may, for example, comprise a cellular telephone network transmission device that sends signals to a server in communication with a plurality of handheld, mobile and/or telephone devices. According to some embodiments, the communication device 260 may also or alternatively be coupled to the processor 210.

Communication device 260 may include, for example, a receiver and a transmitter configured to communicate via signals according to one or more suitable data and/or voice communication systems. In some embodiments, the communication device 260 may comprise an IR, RF, Bluetooth™, and/or Wi-Fi® network device coupled to facilitate communications between the processor 210 and another device (such as one or more mobile devices, server computers, central controllers, and/or third-party data devices). For example, communication device 260 may communicate voice and/or data over mobile telephone networks such as GSM, CDMA, CDMA2000, EDGE or UMTS. Alternately, or in addition, communication device 260 may include receiver/transmitters for data networks including, for example, any IEEE802.x network such as WiFi or Bluetooth™.

The memory device 208 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 208 may, according to some embodiments, store file upload application instructions 212 (e.g., computer-readable software code), files for upload 292, file metadata 294, and/or file upload tracker data 296. In some embodiments, the file upload application instructions 212 may be utilized by the processor 210 to provide output information via the output device 280 and/or the communication device 260.

According to some embodiments, file upload application instructions 212 may be operable to cause the processor 210 to process files for upload 292, and/or file metadata 294, and/or file upload tracker data 296 as described in this disclosure. Files for upload 292 may comprise any type of electronic file, document, database, record, data, etc., that the user wishes to upload.

Similarly, file metadata 294 may comprise any type of electronic file (e.g., a file in the XML format), document, database, record, data, etc., as deemed desirable for storing information associated with one or more files for upload 292. Metadata information may be of any type deemed desirable for a particular implementation, and such types may be determined based on a file management system to which a file for upload is being uploaded. For example, a user may be prompted and/or required to submit certain types of information about a file, such as author's name, company name, sender's name, filename, destination folder or path (e.g., in a file management system), category, creation date, tags, location, GPS, camera type, photography settings, creating application, password protection status, etc. Metadata information may be used, for example, for organizing information in a file management system and/or for facilitating searches of a file management system based on the metadata. In some embodiments, as described in this disclosure, metadata information may be received from a user via a user interface (e.g., a metadata entry screen).

File upload tracker data 296 may include information corresponding to one or more files for upload, and may comprise any type of electronic file, document, database, record, data, etc., as deemed desirable for a particular implementation. In one embodiment, file upload tracker data for multiple files submitted for upload is stored in one file (e.g., in the XML format); in another embodiment, file upload tracker data for multiple files is stored in separate, respective files. File upload tracker data 296 may include, without limitation, a file content tracker for indicating how much of a particular file has been transferred (e.g., a number of bytes transferred, a binary indication that all or none of the file has been transferred), a unique file identifier that identifies the file for upload, and an indication of a current upload status for the associated file (e.g., "pending", "success" or "complete", "error", "transmitting", etc.).

Any or all of the exemplary instructions and data types described herein and other practicable types of data may be stored in any number, type, and/or configuration of memory devices that is or becomes known. The memory device 208 may, for example, comprise one or more data tables or files, databases, table spaces, registers, and/or other storage structures. In some embodiments, multiple databases and/or storage structures (and/or multiple memory devices 208) may be utilized to store information associated with the apparatus 200. According to some embodiments, the memory device 208 may be incorporated into and/or otherwise coupled to the apparatus 200 (e.g., as shown) or may simply be accessible to the apparatus 200 (e.g., externally located and/or situated).

Figure 3:
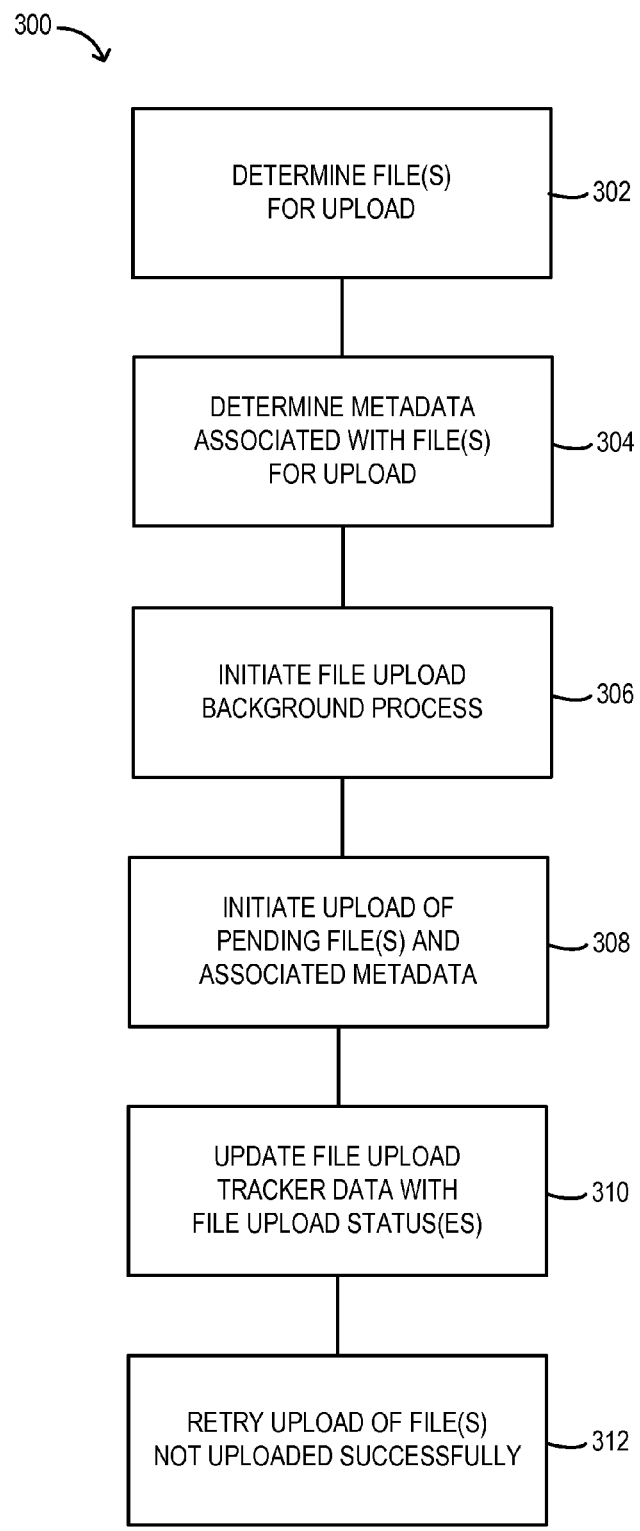
FIG. 3 is a flowchart of a method according to an embodiment of the present invention.

Referring now to FIG. 3, a flow diagram of a method 300 according to some embodiments is shown. The method 300 will be described as being performed by a user device (e.g., a desktop computer, mobile phone, laptop computer, or other type of computing device) operated by a user to upload files from the user device to a remote server (e.g., computer server 102). For example, a user device may execute computer-readable instructions of a file upload application to provide for one or more of the steps of method 300. Any steps described as being performed by a particular computing device may, in some embodiments, be performed by a human or another type of computing device as appropriate.

According to some embodiments, the method 300 may comprise determining one or more files for upload, at 302. In one example, a file upload application may determine files for upload because a user dragged and dropped the files from a location on the user device (e.g., a file folder) to an interface object (e.g., an icon, an application window). The method 300 may comprise determining metadata associated with the one or more files for upload, at 304. In one example, a file upload application may prompt the user with forms for inputting information associated, respectively, with one or more files. Such information may include, for example, a file name, file location, type of file, date of the file, category of the file, etc. Any types of metadata information may be requested in accordance with a desired implementation, and/or in accordance with the requirements of a file management system to which the file is being uploaded.

The method 300 may comprise initiating a file upload background process, at 306. The background process may be initiated when an application is initially launched, when files are submitted for uploading, when metadata information is acquired for pending files, and/or at any time. As described in this disclosure, a file upload background process may manage and control the processing of files and/or associated metadata submitted for upload, including initiating an initial attempt to upload files, tracking upload status data, determining connectivity to an upload destination (e.g., a remote server), facilitating correction of any errors with the files and/or associated metadata, and/or reattempting to upload files (e.g., where upload failed or was not attempted due to lack of connectivity and/or errors in a file or associated metadata).

The method 300 may comprise initiating the uploading of one or more pending files and respective associated metadata, at 308. For example, the file upload background process may check for connectivity between a user device and a remote server, and if the connection is established, may begin to transfer the file's metadata and/or the file itself to the remote server. In another example, initiating the upload may comprise saving a pending file to an appropriate staging location and/or to await further processing (e.g., when a connection is available). In another example, initiating the upload may comprise establishing a file upload status of "pending" in the metadata for a file to be uploaded.

The method 300 may comprise updating file upload tracker data with file upload status(es), at 310. For example, the file upload background process may determine that a particular file was updated successfully, and may update the file upload status in the tracker data (e.g., in file upload tracker data 296, in a separate XML file) associated with that file from a status of "pending" to a status of "success", "complete", or the like. In another example, the file upload background process may determine that an error occurred during an attempt to transfer a given file. For instance, the type of file may not be permitted in a file management system, the file size may be too large, required metadata may be missing, metadata may be incorrect (e.g., fails authentication by a file management system), and/or a user may not be authorized to submit any documents, may not have a user account, or may not be authorized to be submitting documents to a particular file matter (e.g., an insurance claim file). Accordingly, the file upload background process may update the file upload status in the file upload tracker data to a status of "error" to indicate that the user must correct the associated metadata, or remove the file from the upload queue.

The method 300 may comprise retrying to upload files not uploaded successfully, at 312. In some embodiments, retrying may comprise periodically monitoring a connectivity status between a user device and a remote server to see if a connection has been or may be established. In some embodiments, retrying may comprise a file upload application and/or a file upload background process reattempting to upload a pending file after the user device first was not in communication with a remote server, and then establishes a connection with the remote server. For instance, a user may stage files for upload when the user is not in range of a wireless communications network, and then may travel with the user device to a location where the user device has access to a communications network. A file upload background process may periodically retry uploading the file, and may do so successfully once the user device is connected to the network. In some embodiments, retrying may comprise attempting again to upload a file that received an error status, after the user revised the associated metadata so that the file is acceptable to a file management system. For example, a file with an "error" status after an initial failed upload attempt may be resubmitted by a user for upload after adjusting the metadata. A file upload background process may update the upload status (e.g., in file upload tracker data 296) to "pending" again, and automatically continue to attempt to upload the file without further user action.

Figure 4:
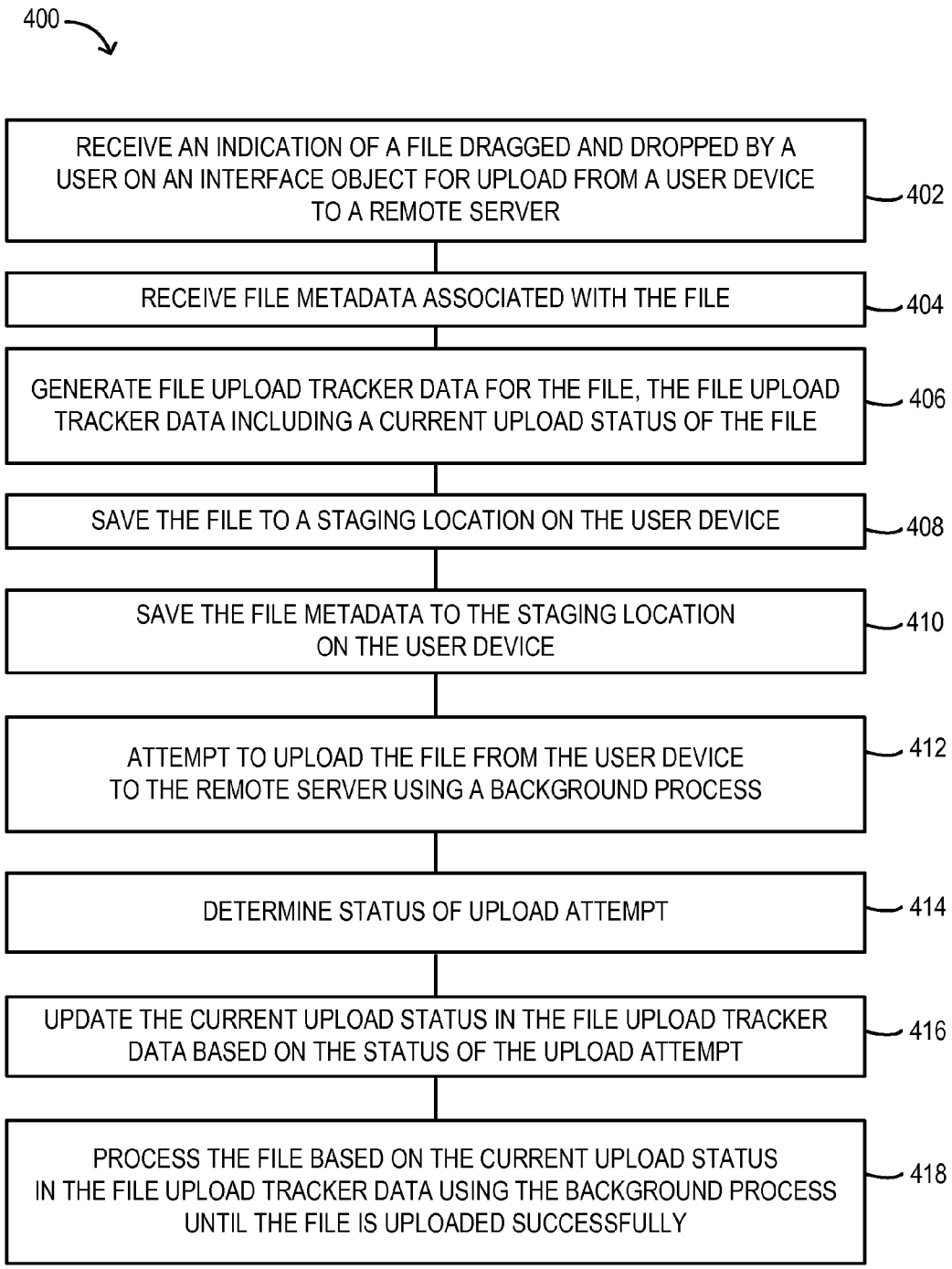
FIG. 4 is a flowchart of a method according to an embodiment of the present invention.

Referring now to FIG. 4, a flow diagram of a method 400 according to some embodiments is shown. The method 400 will be described as being performed by a user device (e.g., a desktop computer, mobile phone, laptop computer, or other type of computing device) operated by a user to upload files from the user device to a remote server (e.g., computer server 102). Any steps described as being performed by a particular computing device may, in some embodiments, be performed by a human or another type of computing device as appropriate.

The method 400 may comprise receiving an indication of a file dragged and dropped by a user on an interface object for upload from a user device to a remote server, at 402. The method 400 may further comprise receiving file metadata associated with the file (e.g., tags, categories, and/or file descriptions input by a user via an input screen, claim information associated with a document an insurance claim handler wants to upload), at 404. The method 400 may further comprise generating file upload tracker data for the file, including a current upload status for the file, at 406. For example, a file upload application may generate an XML file including associated information input by a user for a document for upload, the XML file including a file upload status indicator of "pending." As discussed in this disclosure, file upload tracker data including the current upload status may also include, for example and without limitation, a file identifier that uniquely identifies a corresponding file for upload and/or a file content tracker that indicates an amount of a particular file that has been transferred.

The method 400 may comprise saving the file to a staging location on the user device, at 408, and saving the file metadata to the staging location on the user device, at 410. For example, after a user enters information in a metadata screen for a file, a copy of the file and a copy of a metadata XML file for that pending file may be saved to a staging directory for pending files on the user's laptop (e.g., a shadow or hidden directory).

The method 400 may comprise attempting to upload the file from the user device to the remote server using a background process, at 412, determining a status of the upload attempt, at 416, and updating the current upload status in the file upload tracker data based on the status of the upload attempt, at 414. As described in this disclosure, a background process (e.g., the file upload background process of FIG. 1B) may try to upload files having an upload status of "pending" and/or saved in a staging location for pending files. The background process may determine successful completion of a file upload, may determine lack of a connection or an incomplete transfer, and/or may determine there was an error with the metadata and/or with the file content. In some embodiments, information about the status of the upload attempt may be received from the remote server (e.g., a file upload application web server). In some embodiments, the background process edits an XML file containing a file upload tracker data corresponding to a file to update a current upload status for the file.

The method 400 may comprise processing the file based on the current upload status in the file upload tracker data using the background process until the file is uploaded successfully, at 418. As described in this disclosure, processing a file based on its current upload status may comprise one or more of: (i) removing a file from a staging location if the file is uploaded successfully and/or providing a notification that the file was successfully uploaded, (ii) facilitating correction by the user of any incorrect metadata (e.g., by providing a notification of an error, by presenting a metadata screen for data entry), (iii) moving a file and/or its associated metadata from a staging location to an error location for "error" status files, (iv) moving a file from an error location to the staging location after metadata has been corrected by the user, (v) updating an "error" status to a "pending" "status", and/or (vi) retrying to upload a file to a remote server.

Figure 5:
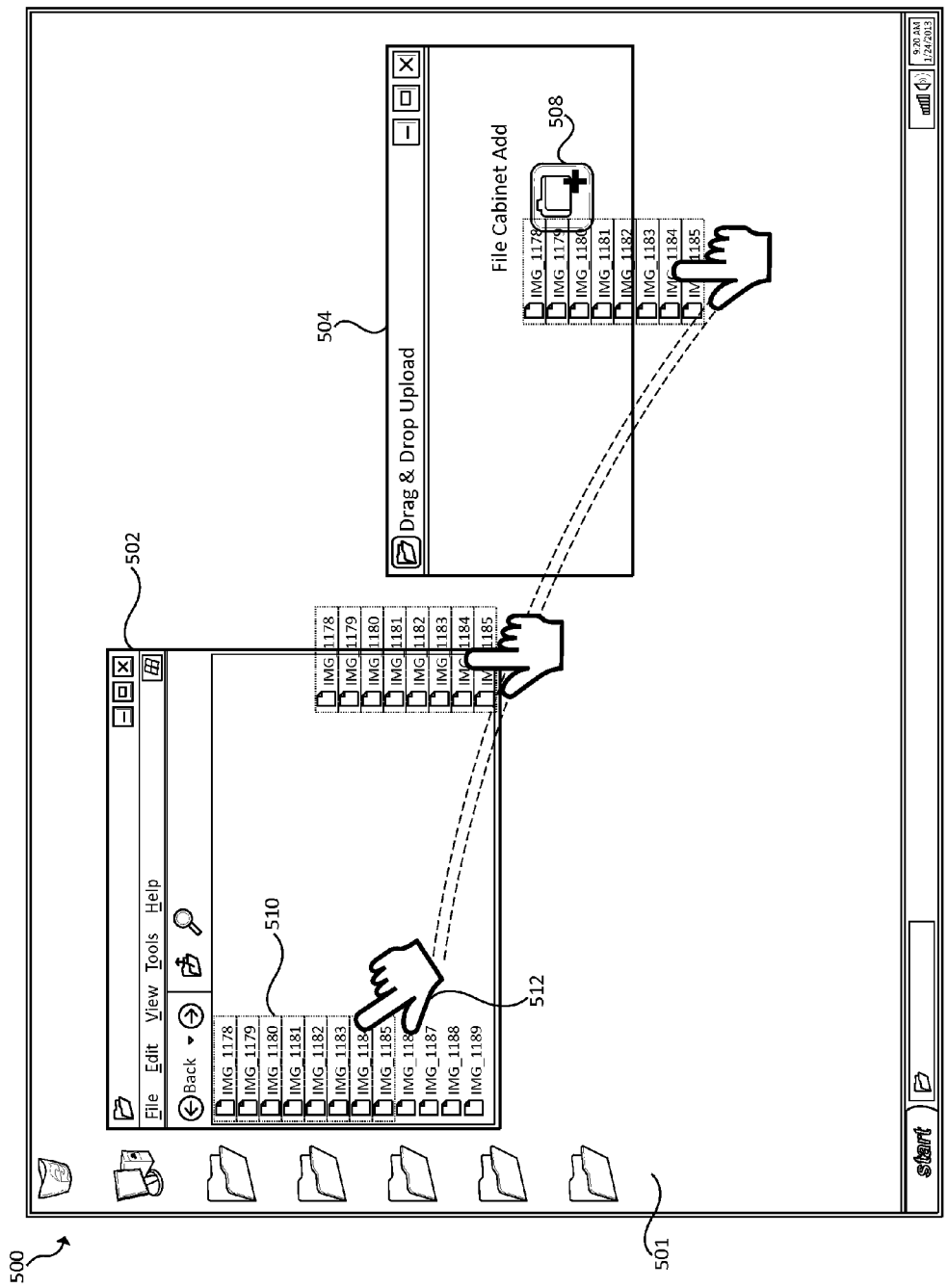
FIG. 5 is a diagram of an example user interface according to an embodiment of the present invention.

Any or all of method 300, method 400, and other methods described in this disclosure may involve one or more interface(s). FIG. 5 illustrates an example interface 500 depicting a computer desktop 501 including a file window 502 and a file upload application window 504. The file upload application window 504 includes an interface object 508 onto which a user may drag and drop files and thereby trigger the processing of those files by the file upload application and/or a file upload controller for uploading to a remote server. As depicted, a user may use a pointing device 512 to select and drag files 510 from file window 502 to the interface object 508 in application window 504. In some embodiments, dropping the files on the interface object 508 may trigger the presentation of an interface screen for entering metadata about the selected file(s).

Figure 6:
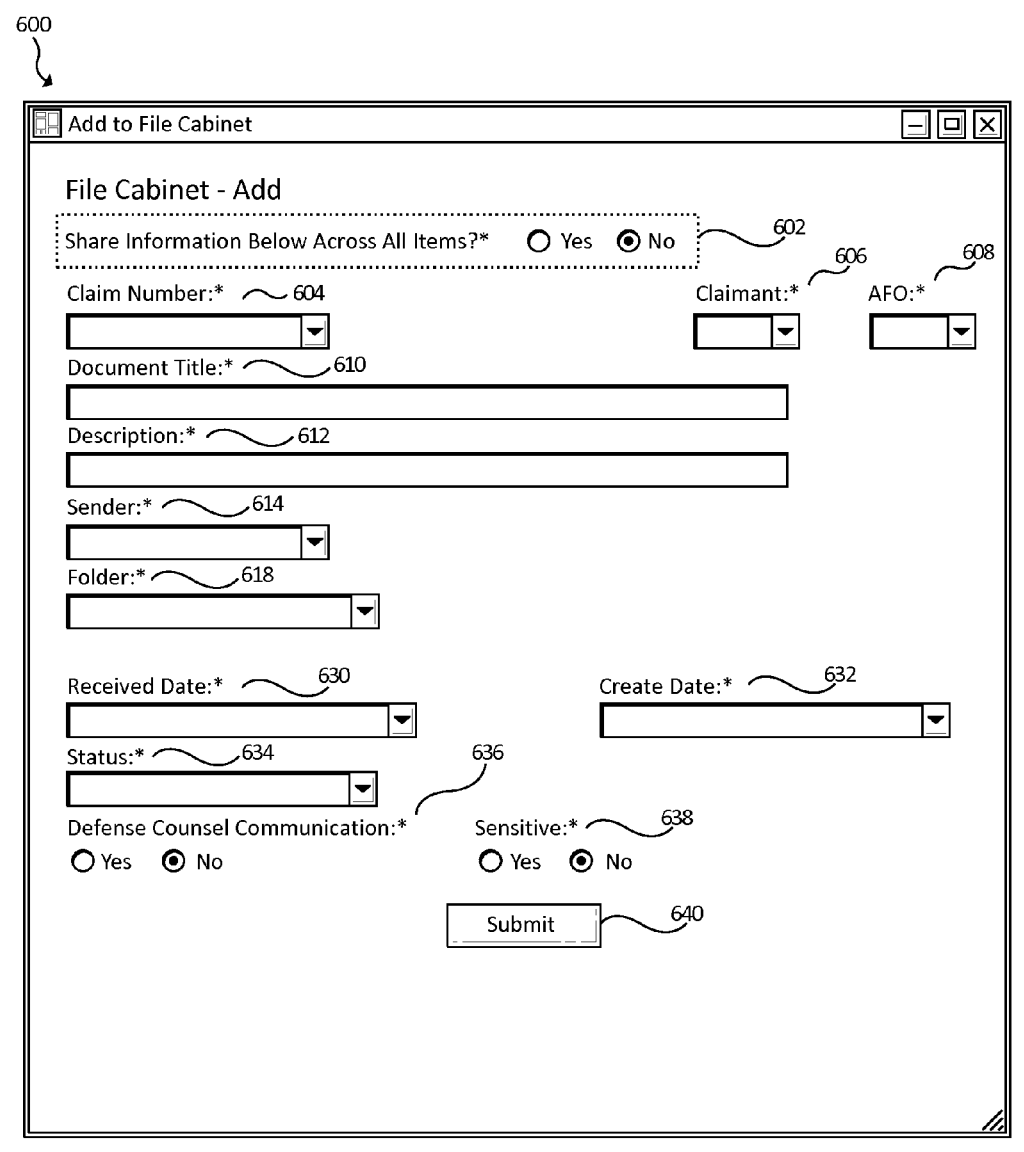

FIG. 6 illustrates another example interface 600 in an exemplary embodiment relating to an insurance claim handling context, through which an insurance claim handler in the field, for example, may input metadata information for documents to be uploaded to a remote server (e.g., to a remote claim management system). In this example, the user is prompted to put in various types of information, including, by way of example and without limitation: an indication 602 of whether the entered information should be shared across all files submitted for uploading, a claim number 604, a claimant identifier 605, an agent field office identifier 608, a document title 610, a document description 612, a sender identifier 614, a folder 618 that identifies a location in a file management system, a received date 630, a create date 632, a status 634, an indication 636 of whether the document relates to defense counsel communication, and an indication 638 of whether the document is considered sensitive. A submit button 640 may be actuated by the user to indicate the user is ready to submit the metadata for processing and/or to initiate upload of the indicated files.

Figure 7:
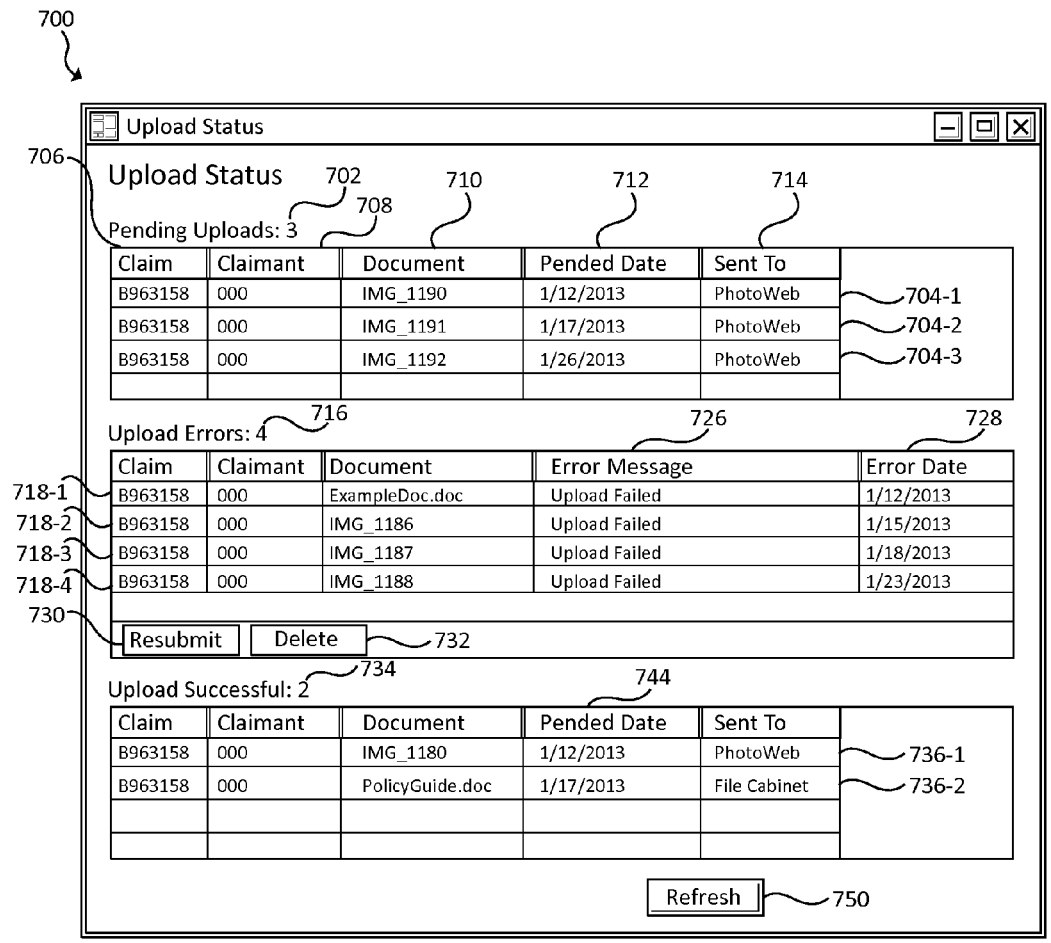
FIG. 7 is a diagram of an example user interface according to an embodiment of the present invention.

FIG. 7 illustrates another example interface 700 in an insurance claim handling context, by which a file upload application may present information about the respective statuses of files submitted for upload. A pending uploads count 702, upload errors count 716, and upload successful count 734 provide respective counts for the files pending upload, files having an error status, and successfully uploaded files. Pending upload records 704-1, 704-2, 704-3 provide information about corresponding files having a pending status. Claim identifier 706, claimant identifier 708, document identifier 710 (e.g., a filename), pended date 712, and file management system identifier 714 provide information about represented files that may be useful to a user in assessing the status of particular files in the upload process. Upload error records 718-1, 718-2, 718-3, and 718-4 provide information about corresponding files having an upload error status. An error message 726 and error date 728 may provide additional information about the respective types of errors and when they occurred. Resubmit button 730 allows a user to initiate a resubmission process that may comprise presenting a data entry screen for the user to input and/or correct metadata for the corresponding file. A delete button 732 allows a user to remove the file from the file upload application. Upload successful records 736-1 and 736-2 provide information about corresponding files that were successfully uploaded. A pended date 744 indicates the date of the upload. A refresh button 750 generates a command to the file update application and/or file upload background process to provide current information (including current upload statuses) about the files being processed.

Although certain types of information related to insurance claim documents are illustrated in the example interfaces 500, 600, and 700, those skilled in the art will understand that the interfaces may be modified in order to provide for different types of information, additional types of information, and/or to remove some of the illustrated types of information, as deemed desirable for a particular implementation.

In one example implementation, a drag and drop application allows an individual to "drag" files from many different locations on a user device (e.g., a mail application such as Microsoft Outlook®, sharedrives, cameras or other attached file storage devices, computer desktop, file folder, etc.) and "drop" the selected files into a capture point (e.g., an application window, an interface icon). The user is also able to drag in multiple items at a time and can choose to share metadata across many items to streamline an upload workflow. Upon the file(s) being dropped into a capture point, the file upload application automatically triggers the presentation of an upload screen into which the user can enter metadata information associated with the file(s). When the user submits files for upload (e.g., by clicking a "Submit" button), the files are put into a queue for upload, and an automated background process attempts to upload all the items in the queue when the user device is connected to a remote file management system (e.g., via a network). The background process runs "behind the scenes" and does not require the user to wait and watch while the upload takes place, and notifies the user of the status of uploads (e.g., pending, error, complete). Accordingly, the example application may work in both a connected mode (e.g., online and connected to a remote file management system) and a disconnected mode (e.g., offline with no network connectivity), enabling a remote user to queue or stage file uploads for when a connection becomes available.

Figure 8:
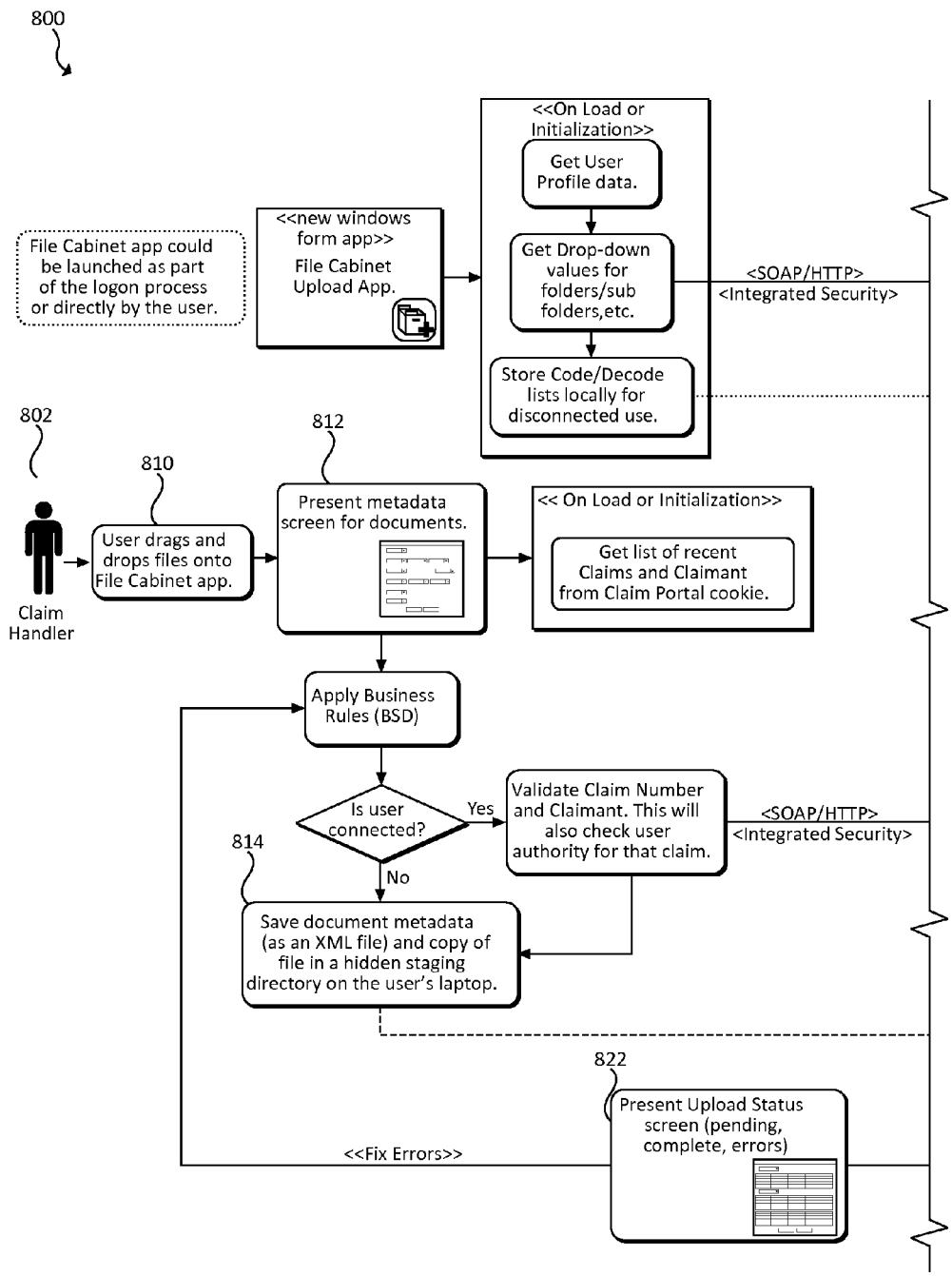
FIG. 8 is a diagram of a system architecture and process flow according to an embodiment of the present invention.
Figure 8:
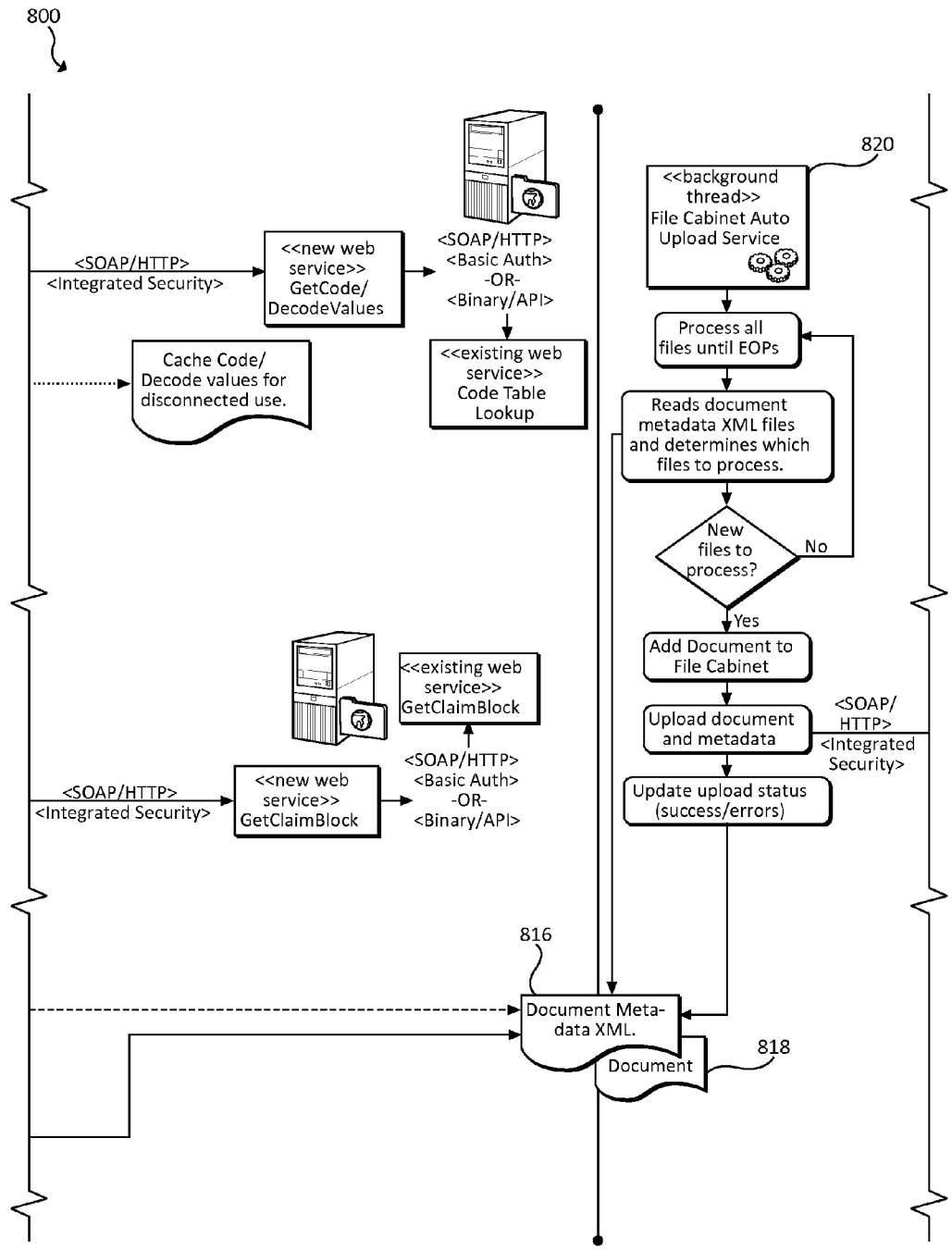
Figure 8:
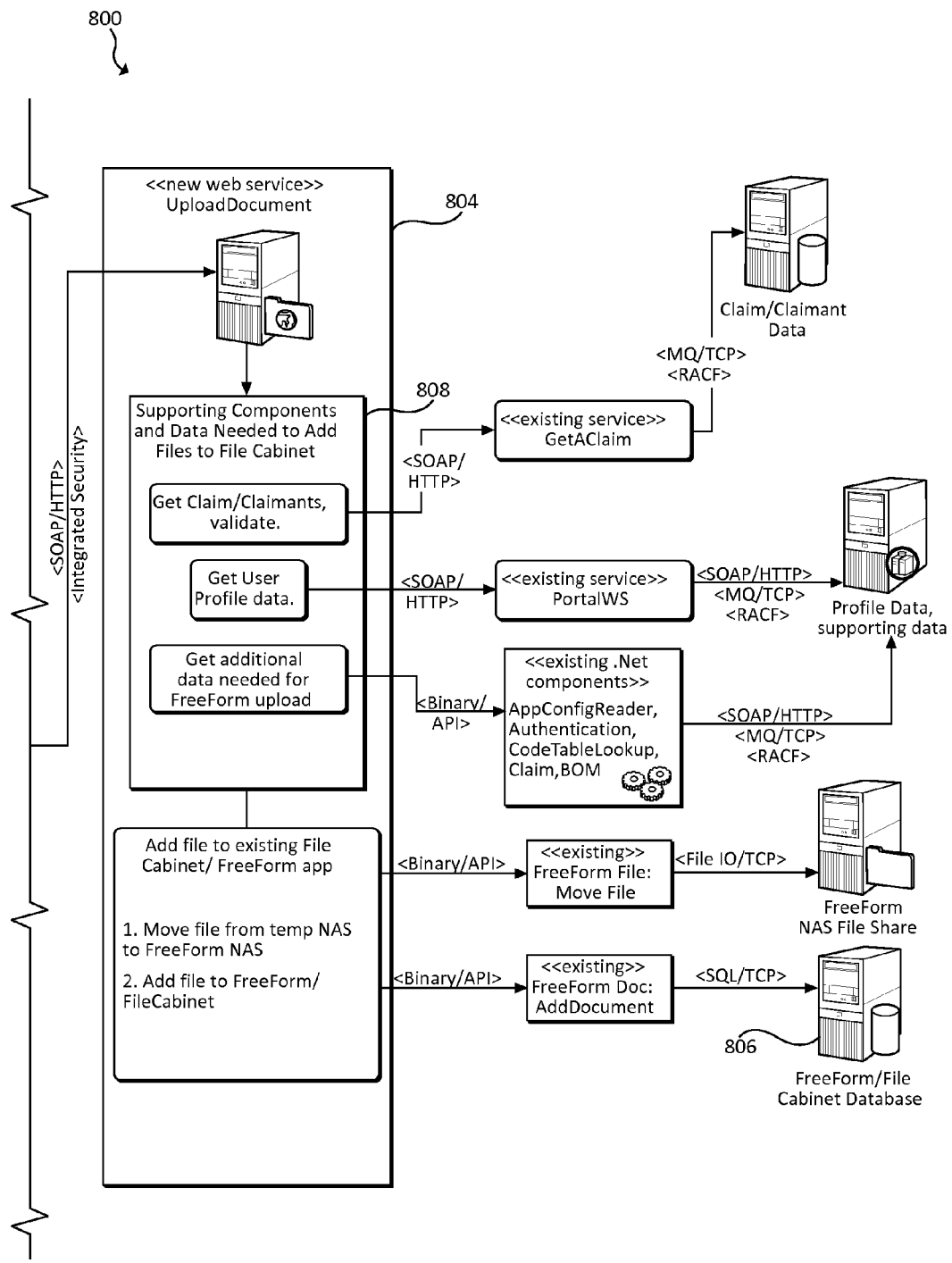

FIG. 8 depicts an example system architecture and workflow 800 in accordance with some embodiments of the present invention. In particular, the example system architecture and workflow 800 describes an example file upload application in an insurance claim handling context allowing a claim handler 802 to upload relevant claim files via a remote file upload application server 804 to an example "File Cabinet" database 806 (e.g., utilized by a file management system). According to one example implementation, "File Cabinet" refers to a repository of documents that may be used by claims professionals to document and manage insurance claims. Users (e.g., claim handlers, claim adjusters, surveyors, etc.) can upload to File Cabinet and can view documents associated with a particular claim. Each file uploaded to File Cabinet is attached to or otherwise associated with a claim number and a claimant number that identifies a claimant. A 'File Cabinet—Add' page is used to upload a file to the File Cabinet and can be accessed from both a main portal and a sub portal.

According to the example system architecture and workflow 800, the file upload application server 804 may provide services such as depicted in process 808 for retrieving (e.g., from one or more corresponding databases) supporting information needed to add uploaded files to the example File Cabinet system, and adding uploaded files to the File Cabinet. Such information may include, for example, claim and claimant identifiers and/or profile data for users of the file upload system (e.g., information, such as authorization or security profiles, about users attempting to upload files remotely).

In one example upload scenario, a claim handler 802 at 810 drags and drops files onto a File Cabinet application for uploading files from his laptop (or other type of user device). At 812 the File Cabinet application presents a metadata screen for the documents to upload. At 814, the document metadata is saved to an XML file 816 and both the XML file 816 and a copy of the document 818 are saved to a staging directory (e.g., a hidden directory) on the user's laptop. At 820, an example background process processes all files designated for upload until all are uploaded (or otherwise removed from the process). In particular, the background process 820 reads document metadata XML files and determines which files to process (e.g. which files are pending for upload), and adds documents to the example File Cabinet database 806 by uploading them and their associated metadata to the file upload application server). The background process 820 also updates or otherwise processes document metadata XML file 816, as necessary, based on the upload status (e.g., success, error, pending). For example, a document metadata XML file 816 may be moved from a staging location to an error location if there are errors with the file, a successfully uploaded file may have the corresponding document metadata XML file removed completely from the laptop, and/or a pending file may remain in a staging location if its upload is still pending.

According to the example scenario, an example upload status screen may be presented, as depicted at 822, for notifying a user of the respective statuses of files being processed (e.g., pending, complete, errors), and the file upload application may allow the user to fix any errors (e.g., prior to resubmitting a file for upload).

In some embodiments, the upload functionality may be achieved by browsing for a file stored in a user's system and/or a connected accessible network drive. The user then clicks on or otherwise actuates an "Add" button in a "File Cabinet—Add" screen. The user can specify the folder and/or sub-folder where the file will be stored, and can enter additional descriptive information about that particular file e.g., (document title or filename, author, received date, etc.). The files uploaded for a claim can be viewed using a "File Cabinet—View" screen.

In some embodiments, the "File Cabinet—Add" screen allows users to upload only one file at a time. If the user has to upload multiple files to the same claim, he has to go through the upload process once for each file of the plurality of files. For example, the user may need to navigate to the 'File Cabinet—Add' page and fill out the required information about a single file being uploaded. The user can then select a file and click the 'Add' button to upload it. To upload multiple files the user may have to repeat the same process multiple times. This process may be time consuming, as the user has to provide detailed information for each file (e.g., even if the information is the same as for other files).

In some embodiments, a user is able to upload multiple files at the same time. In some embodiments, the user may share or associate descriptive information across more than one file being uploaded, and/or may have the option to either share or not share metadata information among multiple files. Advantageously, such embodiments may decrease the time taken for the upload functionality and/or may reduce the number of steps required for uploads.

In accordance with some embodiments, the example implementation may allow users to upload one or more files at a time using a "drag and drop" process to designate the file(s) for upload. Advantageously, such embodiments may decrease the time taken for the upload functionality and/or may reduce the number of steps for uploads.

In accordance with some embodiments, a computer software application (e.g., a desktop application, a smartphone application) is associated with a file upload icon or other interface object (e.g., on a user's computer desktop or home screen). In one example implementation, a process in accordance with some embodiments, may comprise one or more of the following steps: (1) a user selects a single file or multiple files to upload (e.g., to a remote file repository) and drags the file(s) and drops the file(s) (e.g., using a mouse or other pointer device) onto a corresponding icon; (2) when a user drags and drops one or more files on a file upload icon a screen for collecting information about the file(s) pops up; and (3) after the information has been filled out for the file(s) the user can click an "upload" button or otherwise initiate uploading of the file(s). According to the example implementation, in the case of a single file being selected by a user for upload, the screen for collecting information appears only once, and in the case of multiple files being selected for upload, the user may be prompted with an option to choose if he wants to share the same metadata information across all of the files or not. If the user wants to share the information across all the files then the screen may appear only once (e.g., to receive information for all the files). If the user does not want to share the metadata information among the files then a metadata screen may be presented for completion by the user for each and every file that is to be uploaded. According to the example implementation, information entered in a prior screen for one file may be carried forward and presented as a default for a subsequent screen for a second file.

In accordance with some embodiments described in this disclosure, an example process (and systems, apparatus and articles of manufacture for facilitating such a process) provides for the uploading of files to a data repository (e.g., via a network). The process may be implemented, for example, as a computer software application (e.g., running on a laptop computer, personal computer, and/or mobile device). The process includes selecting, by a user, one or more documents (e.g., on a computer) to upload (e.g., to a remote data repository). For example, selecting a document may comprise selecting a file on a computer via a graphical user interface, using a mouse or other pointing device. The process further includes dragging, by the user, the one or more documents to (or into) an interface object (e.g., an application icon). The process further includes determining whether a single file is selected for upload. The process further comprises, if more than one file is being uploaded, determining whether the user wants to share metadata among all of the files for upload. If so, or if only a single file is selected for upload, the process comprises presenting a single metadata screen to the user. Otherwise, if the user wants to provide respective metadata for each of a plurality of files being uploaded, separate metadata screens are presented for reach file. Further, the example process includes a step of determining whether information provided by the user (e.g., via each of the one or more metadata screens) is valid and/or complete for all files to be uploaded. For example, the user may be required to enter a claim number with which a file is associated, and the application may verify that the claim number is a valid claim number. In one example, the user may be required to enter a claim number more than once on a metadata screen, and the entered claim numbers may be compared with one another to ensure they match. In another example, additional types of metadata information may be required. According to the example process, if any entered information is invalid, inconsistent, and/or incomplete, the user may be prompted to correct and/or complete one or more data entries, as necessary. If all of the information entered for the one or more files being uploaded is complete, accurate, and/or consistent, the application attempts to upload the files to the data repository. According to the example process, the user receives (e.g., via a user interface) an indication of files uploaded successfully (e.g., an upload confirmation) and/or receives an indication of any files that were not uploaded successfully (e.g., an error report).

According to some embodiments, a user may upload multiple files only if they belong to the same claim; alternatively, a user may be able to upload a first file associated with a first claim and a second file associated with a second claim, at the same time.

According to some embodiments, destination information (e.g., folder and subfolder values, a filepath) for one or more files for upload are populated or otherwise determined based on a type of claim last accessed by the user.

According to some embodiments, a user may select an email having one or more attachments, and the software application will process the attachments for upload.

In accordance with one example implementation, an example "File Cabinet Upload" application allows a user to upload one or more files to a data repository referred to as "File Cabinet." The File Cabinet Upload application can be launched by running the executable file for the application (e.g., by using navigation Start>Program>File Cabinet Upload). It can also be launched by double clicking on the desktop icon for File Cabinet Upload Application. Launching the application generates a window or other interface object to which a user may drag files to begin an upload. In this example implementation, this object comprises an application window called "File Cabinet—Add." To start a file upload, for example, a user drags and drops one or more files to the "File Cabinet Add" window and a form, dialog box, or other type of user interface object for "File Cabinet—Add" opens up. The File Cabinet—Add form requires the user to enter information regarding the files to be uploaded. In the File Cabinet—Add form, the user can select an option to share entered information across all items for upload. If the user opts to share the information across all items, he or she will need to complete the File Cabinet—Add screen only once. If the user does not opt to share the information across all items, he or she will need to fill up the File Cabinet—Add form once for each file uploaded. Once the user makes all required data entries, the user may click on an "Upload" button on the File Cabinet—Add form, or otherwise initiates the transfer of the files to the File Cabinet.

In some embodiments, a user may be presented with a listing or other indication of files being processed for upload and may be allowed to select or un-select one or more files prior to attempting to transfer the files (e.g., before actuating an "Upload" button). For example, a user may be able to uncheck a checkbox and/or click on a "Skip" button corresponding to one or more files initially submitted for processing in order to exclude those files from the upload process.

According to some embodiments, a user may be presented with information about the upload status of one or more files submitted to upload. For example, when a user clicks on a system tray icon of File Cabinet Upload application (or other indication of an upload application), an "Upload Status" window may be generated that indicates the respective upload status (e.g., successful, pending, and/or error) of one or more files. In some embodiments, when an error occurs during an attempt to upload a file, a bubble, pop-up indication, or other type of visible indication may appear on a user interface to indicate an error. In one example, when a user clicks on a bubble indicating an error has occurred, a screen indicating the respective upload statuses of files submitted for uploaded may be presented.

According to some embodiments, a file may be uploaded only if its file type is one of a predetermined set of one or more allowed file types. In accordance with some embodiments, a process for uploading one or more files comprising determining a file type of a first file, determining a set of one or more allowable file types, and determining whether the file type of the first file is included in the set of allowable file types.

According to some embodiments, a user may be allowed to upload only if he has the appropriate authority. In accordance with some embodiments, a process for uploading one or more files comprises determining an authority or security status associated with a user, determining a required authority or security status for uploading a file, and determining whether the status of the user satisfies the required status for uploading a file.

According to some embodiments, a process for uploading files comprises determining an aggregated count or running count of any files pending or queued for upload. According to one embodiment, items are removed from "pending" status and count once they are uploaded successfully. As files are uploaded successfully, upload status information presented to a user (e.g., via an "Upload Status" window) may be updated (e.g., in real time or by periodic updates).

According to some embodiments, a process for uploading files comprises determining an aggregated count or running count of any files experiencing errors during the upload process. According to one embodiment, items experiencing an error during the upload process are associated with an "error" status until they are uploaded successfully. As files are uploaded successfully, upload status information presented to a user (e.g., via an "Upload Status" window) may be updated (e.g., in real time or by periodic updates) to remove the error items and/or adjust a count of error items.

According to some embodiments, a process for uploading files comprises determining an aggregated count or running count of any files successfully uploaded. According to one embodiment, items experiencing successfully uploaded are associated with a "success" status once they are uploaded successfully. As files are uploaded successfully, upload status information presented to a user (e.g., via an "Upload Status" window) may be updated (e.g., in real time or by periodic updates) to indicate the items successfully uploaded and/or adjust a count of successful uploads.

According to some embodiments, uploading one or more files may comprise determining a connection status between two or more computing devices. In one embodiment, determining a connection status comprises determining whether a user device (e.g., from which a file is to be uploaded) is connected to a network and/or determining whether a user device is in connection with a receiving computing device (e.g., central data repository, Web server).

According to some embodiments, a file may be submitted for upload from a sending user device to a receiving computing device (e.g., by a user dragging the selected file to an interface object corresponding to an upload application) at a first time during which the sending user device is not in communication with the receiving computing device (e.g., a network connection is not established and/or is not available), and the file is queued for transmission to the second computing device once communication is established between the sending user device and the receiving computing device. In one examples, for files that are pending upload due to a user device being offline/disconnected from the receiving data repository, the upload application may keep looping as long as those files are pending to be uploaded. For instance, the upload application may continually or periodically monitor a connection status and, if connection is established, begin to upload a pending file.

According to some embodiments, a file may be submitted for upload from a sending user device to a receiving computing device at a first time during which the sending computing device is in communication with the second computing device, and during a subsequent second time, and before transfer of the file is started and/or completed, the first computing device is not in communication with the second computing device.

Some embodiments provide for a process for uploading a file, the process comprising one or more of the following: determining a file queued for upload from a user device to a receiving computing device; initiating transfer of the file from the user device to the receiving computing device while the user device is in communication with the receiving computing device; after initiating transfer of the file and before completion of transfer of the file to the receiving computing device, determining that the user device is not in communication with the receiving computing device; after determining that the user device is not in communication with the receiving computing device, determining that the user device is in communication with the receiving computing device; in response to determining that the user device is in communication with the receiving computing device, resuming transfer of the file from the user device to the receiving computing device; determining that transfer of the file from the user device to the receiving computing device is complete; and updating an upload status of the file on the user device to indicate that the transfer of the file is complete.

Some embodiments provide for a process for uploading a file, the process comprising one or more of the following: determining a file queued for upload from a user device to a receiving computing device; transferring a first portion of the file from the user device to the receiving computing device while the user device is in communication with the receiving computing device, wherein the first portion is not the entirety of the file; after transferring the first portion of the file and before transfer of the entirety of the file to the receiving computing device, determining that the user device is not in communication with the receiving computing device; after determining that the user device is not in communication with the receiving computing device, determining that the user device is in communication with the receiving computing device; in response to determining that the user device is in communication with the receiving computing device, and completing transfer of the file from the user device to the receiving computing device.

Some embodiments provide for a process for uploading a file, the process comprising one or more of the following: determining a file queued for upload from a user device to a receiving computing device; determining transferring a first portion of the file from the user device to the receiving computing device while the user device is in communication with the receiving computing device, wherein the first portion is not the entirety of the file; after transferring the first portion of the file and before transfer of the entirety of the file to the receiving computing device, determining that the user device is not in communication with the receiving computing device; after determining that the user device is not in communication with the receiving computing device, determining that the user device is in communication with the receiving computing device; in response to determining that the user device is in communication with the receiving computing device, and completing transfer of the file from the user device to the receiving computing device.

According to some embodiments, a user may not be allowed to upload a file that exceeds a predetermined maximum file size and/or a user may be prompted when attempting to upload a file (e.g., when the user clicks on an "Upload" button) if the file exceeds a predetermined maximum size limit. In accordance with some embodiments, a process for uploading one or more files comprises determining a file size of a first file, determining a predetermined maximum file size, and determining whether the first file exceeds the predetermined maximum file size. If the first file is too large, for example, the user may be prompted with a message (e.g., via a user interface) that the file is too large and will not be uploaded.

According to some embodiments, all types of allowable file types may be uploaded using the same user interface objects for uploading files. In some embodiments, all allowable types of files may be dragged to the same icon or other interface objects associated with launching the upload process and/or may have associated information associated with them using the same form for data entry.

According to some alternative embodiments, at least one type of file may be associated with a respective interface object for uploading that type of file and/or may require associated information to be entered via a different data entry form or other user interface. For example, a first type of file (e.g., image files) may be submitted using a first icon or interface object and/or information about submitted image files may be entered via a first data entry form, while a second type of file (e.g., word processing files, spreadsheet files, all other files, etc.) may be submitted using a second icon or interface object and/or information about submitted image files may be entered via a second data entry form. In some embodiments, different types of files may be transmitted to different data repositories, databases, network locations, networks, and/or remote locations. In some examples described in this disclosure, solely for illustrative purposes and without limitation, images files may be submitted via interface objects corresponding to an example "PhotoWeb" system for storing image files, while all other types of files may be submitted via interface objects corresponding to an example "File Cabinet" system.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention may be practiced with various modifications and alterations, such as structural, logical, software, and/or electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features that must be present in all embodiments.

Neither the Title (set forth at the beginning of the first page of this disclosure) nor the Abstract (set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The phrase "based on" does not mean "based only on", unless expressly specified otherwise. In other words, the phrase "based on" describes both "based only on" and "based at least on".

As used in this disclosure, a "user" may generally refer to any individual and/or entity that operates a user device.

Some embodiments may be associated with a "user device" or a "network device". As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/ or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Examples of processors include, without limitation, INTEL's PENTIUM, AMD's ATHLON, or APPLE's A6 processor.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather may include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by, e.g., appropriately-and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated amongst a variety of devices.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

What we claim is:

1. An apparatus for managing file transfers comprising:
a processor; and
a computer-readable memory in communication with the processor, the computer-readable memory storing instructions that when executed by the processor direct the processor to:
receive an indication of a file for upload to a server;
save the file to a staging location;
initiate uploading of the file to the server using a file upload background process;
determine that an error occurred prior to completing the uploading of the file to the server;
generate file upload tracker data for the file that indicates the error occurred;
after determining that the error occurred, move the file from the staging location to an error location; and
process the file, using the file upload background process and based on the file upload tracker data, until the file is uploaded successfully to the server.

2. The apparatus of claim 1, wherein the instructions when executed by the processor further direct the processor to:
receive file metadata associated with the file.

3. The apparatus of claim 2, wherein the instructions when executed by the processor further direct the processor to:
save the file metadata to the staging location.

4. The apparatus of claim 2, wherein the error comprises an error in the file metadata.

5. The apparatus of claim 2, wherein the instructions when executed by the processor further direct the processor to:
after determining that the error occurred, move the file metadata to the error location.

6. The apparatus of claim 2, wherein the instructions when executed by the processor further direct the processor to:
   receive updated information associated with the file; and
   update the file metadata based on the received updated information.

7. The apparatus of claim 6, wherein the instructions when executed by the processor further direct the processor to:
   after updating the file metadata, reattempt to upload the file to the server.

8. The apparatus of claim 6, wherein the instructions when executed by the processor further direct the processor to:
   move the updated file metadata to the staging location.

9. The apparatus of claim 6, wherein the instructions when executed by the processor further direct the processor to:
   present a user interface for receiving the updated information associated with the file.

10. The apparatus of claim 1, wherein the instructions to determine that an error occurred direct the processor to:
    determine a status of the upload attempt.

11. The apparatus of claim 1, wherein the instructions when executed by the processor further direct the processor to:
    determine that a network device from which the file is to be uploaded is not in communication with the server;
    after determining that the network device is not in communication with the server, determine that the network device is in communication with the server; and
    wherein the instructions to process the file direct the processor to:
    after determining that the network device is in communication with the server, automatically reattempt to upload the file to the server until the file is uploaded successfully to the server.

12. The apparatus of claim 1, wherein the error comprises one or more of the following:
    an error authenticating a user, and
    an error with the file.

13. The apparatus of claim 1, wherein the instructions to generate file upload tracker data for the file that indicates the error occurred direct the processor to:
    update an upload status in the file upload tracker data to indicate the error occurred.

14. The apparatus of claim 1, wherein the instructions to process the file direct the processor to:
    automatically reattempt to upload the file to the server until the file is uploaded successfully to the server.

15. The apparatus of claim 1, wherein the instructions when executed by the processor further direct the processor to:
    after moving the file from the staging location to the error location, determine that the file is resubmitted for upload; and
    update the file upload tracker data to indicate the file is pending for upload.

16. The apparatus of claim 1, wherein the instructions when executed by the processor further direct the processor to:
    after moving the file from the staging location to the error location, determine that the error is corrected; and
    update the file upload tracker data to indicate the file is pending for upload.

17. The apparatus of claim 1, wherein the instructions when executed by the processor further direct the processor to:
    determine the uploading of the file to the server was successful.

18. The apparatus of claim 17, wherein the instructions when executed by the processor further direct the processor to:
    remove the file from the staging location.

19. The apparatus of claim 17, wherein the instructions when executed by the processor further direct the processor to:
    update the file upload tracker data to indicate the file was successfully uploaded.

* * * * *